United States Patent [19]

Lin

[11] Patent Number: 4,843,755

[45] Date of Patent: Jul. 4, 1989

[54] BUFFER DEVICE FOR FISHING EQUIPMENT

[76] Inventor: Kuo-Yang Lin, No. 601, Chung Chen Road, Tsao Tun Chen Nantou Hsien, Taiwan

[21] Appl. No.: 268,963

[22] Filed: Nov. 9, 1988

[51] Int. Cl.4 ............................................. A01K 91/00
[52] U.S. Cl. ..................................... 43/42.72; 43/43.1
[58] Field of Search .................. 43/42.72, 43.1, 42.74, 43/42.02

[56] References Cited

U.S. PATENT DOCUMENTS

| | | | |
|---|---|---|---|
| 155,266 | 9/1874 | Sprague | 43/42.72 |
| 1,296,057 | 3/1919 | Ellsworth | 43/42.72 |
| 2,189,979 | 2/1940 | Fender | 43/42.72 |
| 2,606,390 | 8/1952 | Farmer | 43/42.72 |
| 2,731,758 | 1/1956 | Coe | 43/43.1 |
| 2,739,407 | 3/1956 | Godsey | 43/42.72 |
| 3,465,465 | 9/1969 | Smizaski | 43/42.72 |
| 3,774,336 | 11/1973 | Dubois | 43/42.72 |
| 4,794,722 | 1/1989 | Crevoisier | 43/42.72 |

Primary Examiner—Kurt Rowan
Attorney, Agent, or Firm—Browdy and Neimark

[57] ABSTRACT

A buffer device mounted between an upper fishing line and a lower fishing line having fishing hooks attached to the end thereof which is inserted to protect the fishing line from being broken easily due to a large force suddenly applied thereon on a heavy fish being hooked. The present buffer device has a flexible and extensible rod member surrounded by an elongate coil spring, each end of the rod member is provided with an enlarged portion so to permit a corresponding shaped cap having a rotatable ring component disposed on the top thereof to mount on each end of the central rod with the coil spring restrained therebetween, whereby an abruptly applied pull force can be damped by the extended central rod in combination with the coil spring disposed around the central rod.

2 Claims, 2 Drawing Sheets

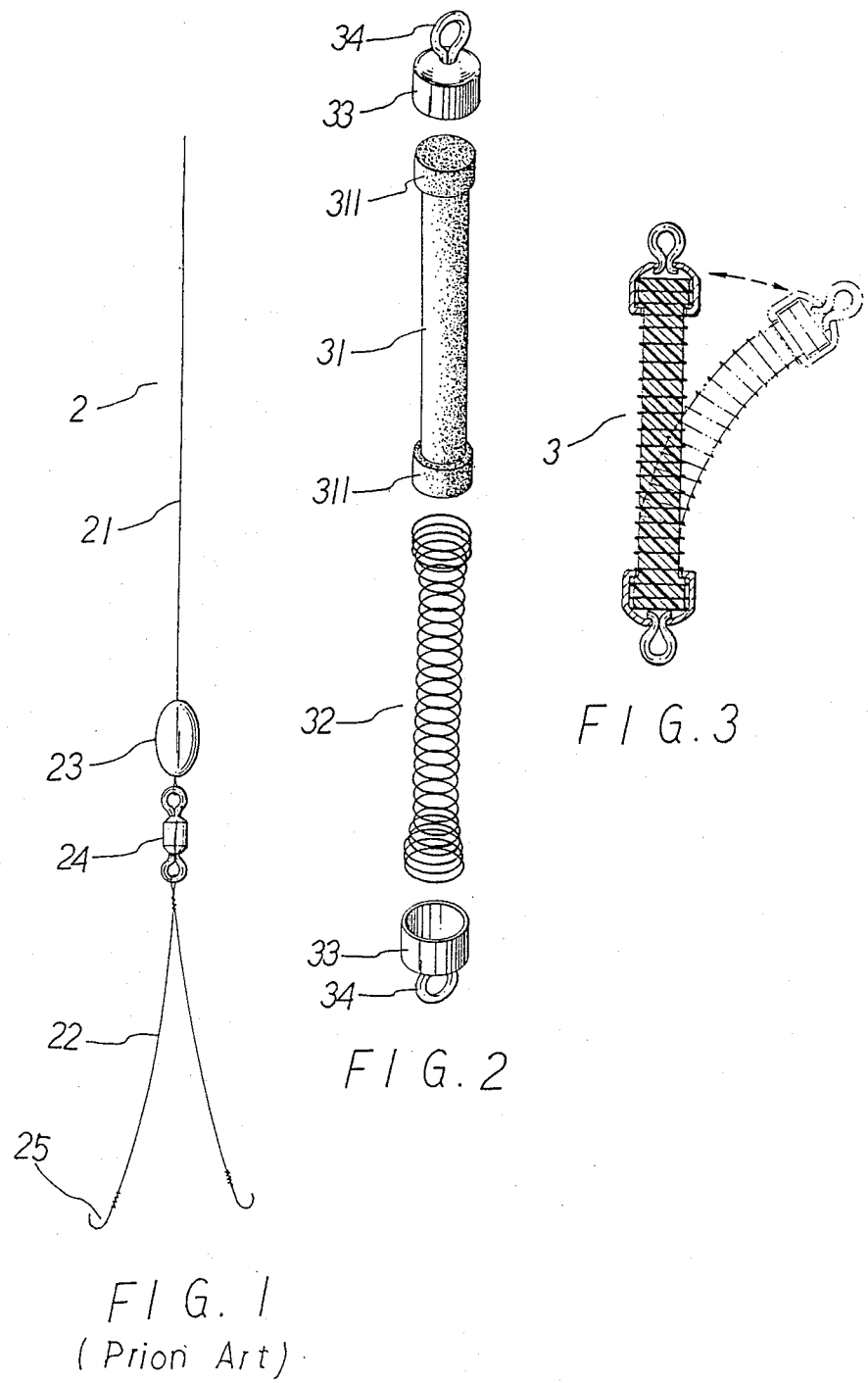

BUFFER DEVICE FOR FISHING EQUIPMENT

FIELD OF THE INVENTION

The present invention relates to a buffer device for use in connection an upper fishing line to a lowr fishing line with hooks attached at the end thereof to alleviate the effect of a sudden pull force produced by hooked fish on the fishing lines, thereby the same can be better protected from breaking. The buffer device of the present invention can be resiliently extended and twisted in response to the external force so that the fisher can enjoy a better chance of success to hook fish without breaking the fishing line.

Many kinds of fishing equipment have been designed and produced to help fishing people to better enjoy the game by making the harvest effortless and with high rate of success, and further to protect the fishing line and rod from being easily broken. To effect the above purpose, the material and elasticity of fishing rods have been improved, the strength of the fishing lines increased and the shape of sinkers and hooks modified.

As shown in FIG. 1, the conventional fishing line 2 is divided into two portions with a sinker 23 and a rigid connection ring member 24 disposed therebetween. The upper fishing line 21 and the lower fishing line 22 having hooks 25 attaced at the front end thereof are coupled respectively to one end of the connecting ring member 24. As fish are hooked and struggling to get free and the fishing rod is lifted by the fisher instantly, a sudden large force will be produced and applied on the fishing lines 21 and 22; without any damping on the suddenly applied pull force, the lower fishing lines 22 having less strength than the upper fishing line 21 are easily broken with the fishing hooks and caught fish being lost, often leaving the fishing people upset and frustrated.

Since the suddenly applied force can last only for a very short period of time, if a buffer device can be disposed between the upper fishing line and the lower fishing line, most of the braking accidents can be prevented.

A number of methods have been adopted to effect the damping purpose. For example, a flexible rod of rubber material is used to serve as a buffer means or a spring element is utilized to effect the same purpose. However, the rubber rod is apt to be broken easily and the use of a coil spring can result in the twining of fishing line.

The present inventor has noticed the problems and devoted his time to provide an improved buffer device which eliminates the preceedingly cited disadvantages.

SUMMARY OF THE INVENTION

Therefore,the primary object of the present invention is to provide a buffer device disposed between the upper fishing line and a lower fishing line having fishing hooks mounted at the end thereof so that suddenly applied force produced by hooked fish struggling to get free can be damped to such a large extent that the fishing line will not be broken by the sudden large force, and the chance of successful fishing can be increased and the fishing equipment can have a longer operation life.

One further object of the present invention is to provide a buffer device disposed between an upper fishing line and a lower fishing line with fishing hooks disposed at the end thereof so that the same fishing line having a definite cross section can be used to hook fish of larger size, and make the fish more easily cheated to bite the bait due to the permission of use of a fishing line of smaller size.

One further object of the present invention is to provide a buffer device disposed between the upper fishing line and lower fishing line, which is free from the disadvantages of the prior rubber buffer means and spring buffer means.

To better demonstrate the structure, features and operation mode of the present invention, a number of drawings are presented in company with a detailed description of the preferred embodiment thereof, in which:

BRIEF DESCRIPTION OF THE DRAWINGS

FIG. 1 is a conventional arrangement of fishing line in association with fishing hooks; FIG. 2 is an exploded diagram showing the detailed structure of the present invention; FIG. 3 is a cross sectional view showing the inner structure and flexibility of the present invention.

DETAILED DESCRIPTION OF THE PREFERRED EMBODIMENT

Figure 4:
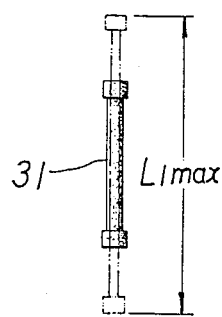
FIG. 4 is a diagram showing the maximum extension of the rubber rod.
Figure 5:
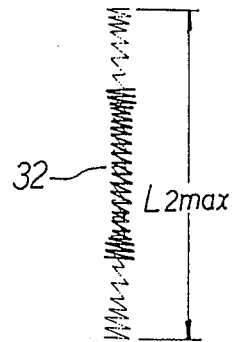
FIG. 5 is a diagram showing the maximum extension of the spring element.

Referring to FIGS. 2, 3, the present buffer device 3 comprises an extensible rod member 31 having at each end an enlarged portion 311; and an elongate coil spring 32 disposed around the pewriphery of the extensible rod member 31, the coil spring 32 also has enlarged ends to conform to the associated extensible rod member 31; and a pair of caps 33 provided with a hook ring 34 at the top thereof and removably mounted to the enlarged end portions 311. The hook rings 34 are rotatable relative to the caps 33 in operation. The upper fishing line 4 and lower fishing line 42 having hooks 5 attached at the split ends thereof are coupled to each other by means of the extensible buffer device 3 with the help of the hook rings 34 on the caps 33.

As shown in FIG. 1 is the conventional arrangement of a fishing line 2 including an upper fishing line 21 and a lower fishing line 22 which are connected with each other by a rigid connection device 24 having a hook ring disposed at each end thereof. The cross section of the lower fishing line 22 is generally smaller than that of the upper fishing line 21. On fish being hooked, the force suddenly applied on the lower fishing line 21 by the struggling fish will often result in the breaking thereof due tothe weaker strength of the lower fishing line 21.

Figures 6, 7, 8:
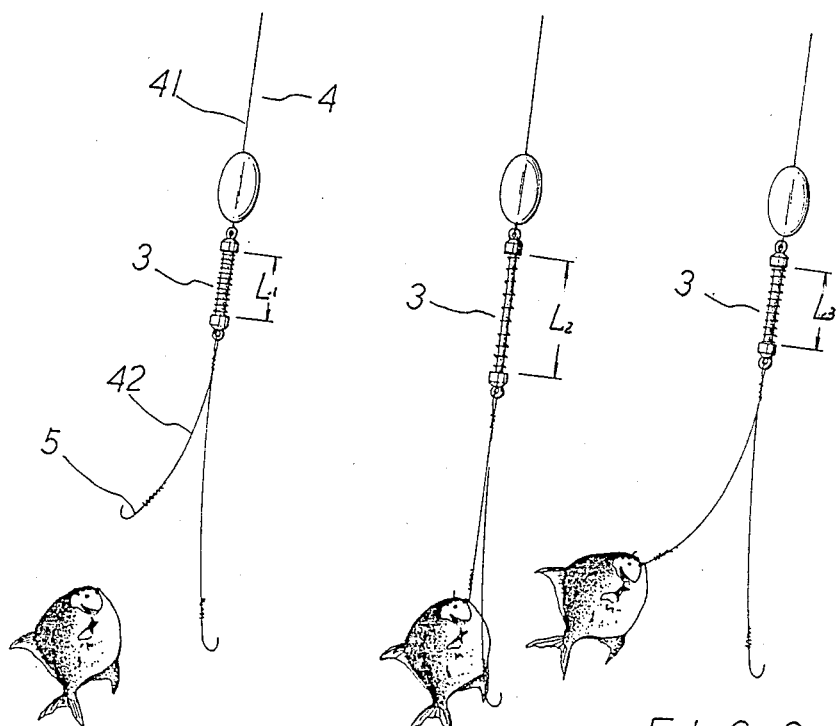
FIG. 6 is a diagram showing the natural status of the present invention.
FIG. 7 is a diagram showing the extension of the present invention due to the struggling of a hooked fish.
FIG. 8 is a diagram showing the extension of the present invention with the hooked fish attached without struggling on the fishing hook.

Referring to FIGS. 6, 7, 8, the present buffer device 3 has a natural length L1; and when a fish is hooked at the end of the lower fishing line 42, the buffer device 3 absorbs most of the suddenly applied impact of the lower fishing line and extends to length L2; and the hooked fish at the end of its struggle due to exhaustion extends the buffer device 3 to length L3. Thereby the fishing lines 21, 22 are better protected from being broken by suddenly applied force through the use of the present buffer device 3.

The use of the present buffer device 3 permits the replacement of the lower fishing line 22 by another line of smaller size so that fish will be more aptly confued or cheated to bite the bait, therefore fish can be hooked more readily than before. Besides, the thinner the lower fishing line 22, the more flexible the same is, thus increasing the chance of confusing fish to approach and take the baits.

Referring to FIGS. 3, 4, the maximum extension of the extensile rod member 31 operated under normal condition is L1 max which is smaller than that of the elongate coil spring, i.e., L2 max. Thus the rod member can resume its original shape with the help of the elongate coil spring 32.

It becomes clear now that the present buffer device 3 can effect the purpose of protecting fishing line from being broken by suddenly applied large force produced by struggling fish and enhance the chance of sucessful catching fish thereby.

What is claimed is:

1. A buffer device for use in connection of an upper fishing line and lower fishing line having fishing hooks attached at the end thereof, the lower fishing line being generally of smaller size than said upper fishing line in practical use; said buffer device comprising an extensible flexible rod member having at each end thereof an enlarged portion; an elongate coil spring disposed around the periphery of said rod member and having an enlarged portion at each end in conformance to that of said rod member; a pair of caps securely mounted at each end of said rod member and said coil spring, at the top of each cap being disposed a ring element which is rotatable with respect to the axis of said cap; said cap and the enlarged portions of said extensible rod member and said coil spring being integrally united together in operation so that by extension of said buffer device the lower fishing line or upper fishing line can be protected from being broken by suddenly applied large force produced by struggling fish.

2. A buffer device as claimed in claim 1 wherein said extensible rod member is made of rubber material in an integral form.

* * * * *